US005658972A

United States Patent [19]

Grzybowski et al.

[11] Patent Number: 5,658,972
[45] Date of Patent: Aug. 19, 1997

[54] FIRE RETARDANT PLASTIC CONSTRUCTION MATERIAL

[75] Inventors: Kenneth Francis Grzybowski, Temple Terrace; David Reese Jones, IV, Tampa, both of Fla.; William Russell Welliver, Ship Bottom, N.J.; Timothy Jay Roth, Allentown, Pa.

[73] Assignee: Air Products and Chemicals, Inc., Allentown, Pa.

[21] Appl. No.: 565,178

[22] Filed: Nov. 28, 1995

[51] Int. Cl.$^6$ .................. C08K 11/00; C09D 5/16
[52] U.S. Cl. .................. 524/59; 106/18.26; 106/277; 106/284.3; 252/311.5; 524/70; 524/705
[58] Field of Search .................. 524/64, 71, 59, 524/68, 70, 705, 60; 523/450, 334; 106/18.26, 277, 284.3; 252/311.5

[56] References Cited

U.S. PATENT DOCUMENTS

| | | | |
|---|---|---|---|
| 3,513,114 | 5/1970 | Hahn et al. | 260/8 |
| 3,654,190 | 4/1972 | Levine | 260/2.5 |
| 3,725,315 | 4/1973 | Bauer | 521/83 |
| 3,869,417 | 3/1975 | Ramsay | 524/68 |
| 4,058,643 | 11/1977 | Marshall et al. | 428/198 |
| 4,229,329 | 10/1980 | Bennett | 260/17 |
| 4,328,147 | 5/1982 | Charp et al. | 428/280 |
| 4,331,726 | 5/1982 | Cleary | 428/143 |
| 4,365,026 | 12/1982 | Pawloski et al. | 521/168 |
| 4,385,131 | 5/1983 | Fracalossi et al. | 521/55 |
| 4,425,440 | 1/1984 | Bloembergen et al. | 521/54 |
| 4,430,108 | 2/1984 | Hojaji et al. | 65/22 |
| 4,497,921 | 2/1985 | Charp et al. | 524/70 |
| 4,499,215 | 2/1985 | Okada | 523/450 |
| 4,544,411 | 10/1985 | Wombles et al. | 106/279 |
| 4,659,385 | 4/1987 | Costopoulos et al. | 106/87 |
| 4,737,524 | 4/1988 | Ako et al. | 521/83 |
| 4,745,032 | 5/1988 | Morrison | 428/215 |
| 4,757,093 | 7/1988 | Ricciardi et al. | 521/107 |
| 4,795,478 | 1/1989 | Layrisse | 44/51 |
| 4,871,477 | 10/1989 | Dimanshteyn | 252/609 |
| 4,878,950 | 11/1989 | Halasz et al. | 524/71 |
| 4,882,373 | 11/1989 | Moran | 524/68 |
| 4,923,483 | 5/1990 | Layrisse | 48/51 |
| 4,956,217 | 9/1990 | Heitkamp | 428/116 |
| 5,102,463 | 4/1992 | Jolitz et al. | 106/273.1 |
| 5,120,708 | 6/1992 | Melear et al. | 106/277 |
| 5,154,976 | 10/1992 | Gallo | 428/413 |
| 5,198,483 | 3/1993 | Gainer | 524/100 |
| 5,206,668 | 4/1993 | Kalkanogles | 428/143 |
| 5,225,464 | 7/1993 | Hill, Jr. | 524/100 |
| 5,248,509 | 9/1993 | Kamel et al. | 106/273.1 |
| 5,308,898 | 5/1994 | Dawans et al. | 521/83 |
| 5,336,705 | 8/1994 | Gorbaty et al. | 524/68 |
| 5,342,866 | 8/1994 | Trumbore et al. | 524/68 |
| 5,348,994 | 9/1994 | Gorbaty et al. | 524/68 |
| 5,362,316 | 11/1994 | Paradise | 106/278 |
| 5,379,902 | 1/1995 | Wen et al. | 209/166 |
| 5,441,548 | 8/1995 | Brandl et al. | 48/215 |
| 5,488,807 | 2/1996 | Terrenzio et al. | 52/555 |

FOREIGN PATENT DOCUMENTS

| | | | |
|---|---|---|---|
| 851763 | 9/1970 | Canada | 521/83 |
| 61-152740 | 7/1986 | Japan | 521/83 |
| 61-152743 | 7/1986 | Japan | 521/83 |

*Primary Examiner*—Veronica P. Hoke
*Attorney, Agent, or Firm*—Thomas G. Ryder

[57] ABSTRACT

Fire retardant plastic construction materials containing a fire retarding quantity of the oxidation product of certain asphalts.

40 Claims, No Drawings

FIRE RETARDANT PLASTIC CONSTRUCTION MATERIAL

BACKGROUND OF THE INVENTION

This invention is directed to plastic construction materials having enhanced fire retarding properties. More particularly, this invention is directed to plastic construction materials containing a fire retarding quantity of the oxidation product of certain asphalts.

Plastic construction materials, as used herein, due to their varied and desirable properties, find utility in a wide array of employments. Thus, some plastic construction materials are used as thermal and electrical insulators, while others are used to make construction materials and furniture, and still others, such as petroleum asphalts, which are colloidally dispersed hydrocarbons in crude petroleum and can be obtained by fractionation of source petroleum, or bitumens, are used to make road and roofing compositions. In their final forms, plastic construction materials can be made into rigid bodies and flexible bodies, foams and solids, etc. The variety of physical properties of plastics has permitted them to become used in an extremely broad spectrum of applications. One common fault with plastics, however, is the fact that plastics, in fact, most polymers, are organic in nature and, thus, tend to burn or decompose when exposed to heat and oxygen.

The term "plastic construction materials", as used herein, is meant to encompass a wide variety of materials which can generally be described as being composed predominantly of an organic substance of large molecular mass, which is solid (or at least semi-solid) in its finished state, at standard temperature and pressure, but at some point in its manufacture or processing can be shaped by flow. Typically, many, but not all, of such materials are polymeric and are usually thermoplastic or thermosetting. These materials can be molded, cast, extruded, drawn, coated onto a substrate or laminated into various shapes and objects such as, beads, powders, films, fibers, plates, filaments or rods.

Bitumens are a class of amorphous, solid, semi-solid or viscous, cementitious substances, natural or manufactured, composed generally without limitation of high molecular weight hydrocarbons, as typically found in asphalts, tars, pitches and asphaltites. Bituminous materials are typically derived from asphalt or coal tar, with asphalt found naturally or attainable as a by-product of crude oil refining, and coal tar and pitches produced by the destructive distillation of coal. The compositional make up of coal, coal tar pitches, crude oils and natural asphalts vary depending upon the geological origin and/or geographical source. As a result, the physical characteristics of any one bituminous material, whether natural or manufactured, can differ markedly from another. The variety of bitumens give it wide utility in the building and construction industry.

The performance required of any such bituminous material is determined by its end use and/or application and is gauged by one or more measurable properties. A bitumen used in the fabrication of a roofing product can be defined by its softening point, penetration, flash point, viscosity-temperature relationship, among other such performance properties.

For illustrative purposes, consider asphalt as a representative bitumen used for building/construction. Asphalt materials used in the roofing context must be designed to perform several somewhat diverse functions. In order to saturate and impregnate an organic or comparable base material, a roofing asphalt must be very fluid at processing temperatures. In addition to saturation, the asphalt must also serve as a medium for various fillers and/or stabilizers, and promote surface adherence of mineral granules. Once applied as part of a roofing material, the asphalt should retain its durability and/or weather resistance over a wide range of temperature extremes. Evaluation of its performance properties determines the suitability of any one asphalt for a given roofing application.

The overall performance of a roofing composition will depend upon the properties of the various components, as well as their interaction and interdependence upon one another. For example and as mentioned above, coating asphalts are often reinforced with a mineral stabilizer/filler such as ground limestone, slate, or traprock. The stabilizer/filler enhances asphalt durability and increases resistance to fire and weathering. Depending upon the specific physical and/or performance requirements, such asphalt materials can be incorporated into any one of a number of residential and commercial roofing products, including shingles, roll roofing, underlayments and various membranes.

Where a bituminous material is intended for a roofing or other application does not initially have the desired performance properties, further processing can modify and/or tailor the bitumen for a given use/application. Using asphalt as an example, refining processes can be altered to provide the desired asphalt. Another approach is to incorporate the bitumen into a cold-applied system, which can take the form of one of various cutback solvent and aqueous emulsion compositions.

A common modification technique is oxidation of the bitumen through the introduction of hot air through a heated fluid bitumen. While the mechanism is not fully understood, the heat and oxygen are thought to initiate various chemical reactions, changing the physical properties of the bitumen. This "air blowing" process can be monitored and halted when the desired properties/characteristics are obtained. Other methods, including addition of various catalytic agents, can also be used to effect oxidation, modify the bitumen material and alter its performance properties.

The addition of modifiers has been used to overcome many problems. For over 100 years, natural rubber has been incorporated into bitumens (often emulsified, cutback or otherwise treated) to provide elasticity and improve the handling and service qualities. More recently, synthetic or reclaimed rubber, alone or with other modifiers, such as, fibers, fillers, natural asphaltites, oils, and other polymers, have been incorporated into asphalt to modify various physical properties relating to viscosity or flow, extendibility, and brittleness. Numerous polymeric systems have been used to modify bitumens.

As known to those skilled in the art the terms bitumen and bituminous can refer generically to various asphalts, coal tars, pitches and the like. However as it is also understood that outside North America and, particularly, the United States, the term "bitumen" is applied generically to mean other asphalt materials. The compositions of this invention include those comprising the high molecular weight hydrocarbons which predominate and are found in asphalts, coal tars, pitches, asphaltites and the like, notwithstanding any difference in generic nomenclature. Accordingly, the bitumen component of the inventive compositions described herein can be drawn, without limitation, from various known sources of asphalt, coal, tar, and coal tar pitches, whether neat, dissolved, emulsified, or polymer modified.

More specifically, an asphalt material treated in accordance with this invention can be derived from any one of a number of refined crude oils, naturally occurring asphalts, and combinations thereof. Included within the broad category of refined crude oils are various recycled asphaltic waste materials. More particularly, the asphalt material can be a roofing asphalt having physical properties meeting or equivalent to ASTM D 312 standard specifications for use of such an asphalt in built-up roof construction or an asphalt having physical properties meeting or equivalent to ASTM D 449 standard specifications for use in damp-and waterproofing. While various physical properties are described in the context of recognized ASTM standards, comparable and/or equivalent standards and specifications can also be used to describe this bitumen component, including but not limited to such standards recognized in Germany, the United Kingdom, Italy and Canada.

It should be understood and as is apparent from the examples, tables and surveys which follow that the asphalt element/component of method(s) and/or compositions of this invention is not limited to any one type or grade specified in the latest revision of the aforementioned ASTM standards and/or any previous version thereof. Preferred embodiments include specified types and/or grades where improved performance properties are desired, and the modifications/enhancements contemplated herein include those associated with movement from one type or grade to another and depending upon use or application. With equal utility, the bituminous compositions can comprise non-air blown or partially air blown asphalts having physical properties either within or outside the ASTM standards. As referenced in each of the aforementioned ASTM standards, incorporated herein in their entirety, and as well-known to those skilled in the art, the bitumen specified under each standard is prepared from commercially-available raw materials by known methods. The same can be used with the present invention, with the resulting compositions suitable for air blowing or having the physical properties of a specific ASTM type or grade.

Over the course of the years, many suggestions have been made to reduce the flammability, ignition, combustion or flame spread of various plastic construction materials (including petroleum asphalts used in building construction). Thus, for example, it has been proposed to employ a variety of phosphorus compounds (e.g., polyphosphates and salts of phosphoric acid) as a means of imparting fire retardancy to many materials. See for example, U.S. Pat. Nos. 3,513,114; 4,058,643; 5,198,483; and 5,225,464. It has also been proposed, for example in U.S. Pat. No. 4,365,026 and 3,654,190, to employ halogen, particularly bromine, compounds as fire retardants. Suggestions have been made to employ coal fly ash, as an inert material, to increase the fire retardancy of materials, such as in U.S. Pat. Nos. 4,425,440; 4,229,329; 4,331,726; 4,659,385; and 4,430,108. Melamine has been proposed, especially for use with polyurethane, in U.S. Pat. Nos. 4,385,131; 4,757,093; and 3,654,190. Other materials, such as alumina trihydrate (U.S. Pat. No. 4,871,477), sodium silicate (U.S. Pat. No. 4,956,217), and antimony pentoxide (U.S. Pat. No. 5,154,970) have also been proposed for use as fire retardants. The art also teaches that various of these materials can be incorporated into the material to be protected or applied as a coating or paint. It has also been proposed to employ many of these materials as well as ammonium sulfate and silicone polymers to enhance the fire retardancy of asphalts for use in construction applications (U.S. Pat. No. 5,102,463).

All of the above mentioned materials impart fire retardant properties to a greater or lesser extent depending upon the fire retardant chemicals themselves and the compositions with which they are employed. Futhermore, while not all fire retardants are equally useful in all materials, it has been found that a fire retardant demonstrated to have utility in one type of material will generally have fire retardant capability in species of the particular type of material. Similarly, it is also known that if a fire retardant has utility in connection with a group of materials, another fire retardant having utility in one of the groups will also have utility in the other members of the same group. The outline of this can be seen in the following table developed from *The Chemistry and Uses of Fire Retardants*, John W. Lyons, Wiley-Interscience, 1970 and *Handbook of Flame Retardant Chemicals and Fire Testing Services*, Technomic Publishing Company, Inc., 1992.

|  | Phosphoric acid, salts, and esters | Phosphorous oxides | Antimony | Boron | Halogen (Chlorine/ Bromine) | Alumina Trihydrate |
|---|---|---|---|---|---|---|
| Cellulose | X | X | X | X | X | X |
| Polyolefins |  | X |  |  | X | X |
| Vinyls | X |  |  | X | X | X |
| Acrylics | X | X | X |  | X |  |
| Polystyrene |  | X |  |  | X |  |
| ABS | X |  | X |  | X | X |
| Rubber & elastomers | X | X | X |  | X | X |
| Asphalt | X | X | X |  | X | X |
| Engineering Plastics | X | X | X |  | X |  |
| Polyurethane | X | X |  |  | X | X |
| Epoxy | X | X | X |  | X | X |

The cost for obtaining a particular degree of fire retardancy also varies depending upon the cost of the particular fire retardant chemical and the quantity in which it must be employed to provide the desired degree of fire retardancy. Accordingly, there is a continuing demand for new and different materials that will impart or enhance fire retarding properties of materials, generally, but particularly in connection with plastic construction materials, as defined above.

SUMMARY OF THE INVENTION

Our invention relates to a composition of enhanced fire retardancy comprising a plastic construction material of low fire retardancy and an oxidation product of a naturally occurring asphalt from the Orinoco Belt in Venezuela. Broadly, our invention is useful with the spectrum of plastic construction materials, which are described as materials containing as an essential or dominant ingredient an organic substance of relatively large molecular mass that can be molded cast, extruded, drawn, laminated or otherwise fabricated by flow during its manufacture or processing and which is generally a solid under standard conditions of temperature and pressure. Such materials are usually thermoplastic or thermosetting. These plastic construction materials include, for example, asphalt roofing compositions (and the products thereof), cellulose, polyolefins, vinyls, acrylics, polystyrene, acrylonitrile-butadiene-styrene (ABS), rubber and elastomers, engineering plastics, polyurethane and epoxy.

Generally and as will be well known to those skilled in the art made aware of the invention, an oxidation product of a naturally occurring asphalt from the Orinoco Belt of Venezuela can be prepared by contacting the asphalt material with air and/or another oxygen-containing stream, through any one of several recognized processes or variations thereof, to provide the oxidation product in addition to combustion by-products such as heat, carbon dioxide and water. The oxidation product is the solid residual material subsequently collected downstream from the point of combustion/oxidation.

The oxidation product of the present invention can be generated in such a manner as to include the introduction of one of several auxiliary processes and/or additives upstream, downstream or at the point of combustion, to meet various process or combustion requirements, relating but not limited to emission control, reduced corrosion or enhanced operability. Depending upon the nature of these additives, the combustion residue or by-products thereof can become intimately co-mingled with either the oxidation product described above and can be, where appropriate, considered part of, integral to, and used with the present invention.

Illustrative of an auxiliary process and/or additive is the incorporation of a flue gas clean up device—such as a wet lime-limestone scrubber—downstream from the combuster. Residual scrubber residues can be returned and/or reintroduced to the combustion/oxidation line at a point upstream of the final particulate separator, such that the residues are mixed with and incorporated into the oxidation product. Again, considering a scrubber process as illustrative of a number of available auxiliary processes, one skilled in the art will recognize that the identity/composition of the scrubber residues are a factor of the identity of the particular scrubbing reagent, whether it be lime, limestone or a related scrubbing reagent, and the compositional components and their relative concentrations of the make-up of water used in the scrubber.

While the particular concentration of the oxidation product required to provide a desired degree of fire retardancy can vary from one plastic construction material to another, we have found that the effective range of oxidation product concentration in the final product can be as low as about 1 percent by weight and can range up to levels just short of having an adverse affect upon the other properties of the plastic construction material, such as, for example, about 60 percent by weight. Furthermore, other additives, including those well known in the different industries where the plastic construction materials are to be employed, can be included in the total composition.

DETAILED DESCRIPTION OF THE INVENTION

We have found that our invention is generally useful with plastic construction materials and is particularly suitable for use in connection with materials such as asphalts or bitumens, representing both naturally occurring asphalts and those obtained through the processing and treatment of liquid petroleum stocks, as well as the materials prepared therefrom and useful in construction products. Such asphalt construction products include, for example, residential roofing shingles, modified bitumen roofing membranes and liquid applied roofing systems. Further our invention is particularly useful in connection with polymeric plastics, such as, for example, acrylics, polyurethanes, polyesters, polystyrene, epoxoids, acrylonitrile-butadiene-styrene, nylon and polypropylene, just to name a few.

Preferably, the oxidation product utilized in our invention is obtained by oxiding an aqueous emulsion of a naturally occurring asphalt from the Orinoco Belt of Venezuela. Generally, such a emulsion can be prepared by utilizing a small quantity of an emulsifying agent and intimately intermixing the asphalt and the aqueous base. We have found that such aqueous emulsions containing other additives can be employed in our invention. Thus, for example, such an aqueous emulsion to which has been added a quantity of magnesium, measured as elemental magnesium, in the range of from about 100 to about 1500 ppm by weight based upon the total emulsion is quite satisfactory. In such an emulsion, the magnesium is usually introduced in the form of a water soluble salt of magnesium.

An asphaltic precursor to the oxidation products of this invention and which contains the above described amount of magnesium is commercially available from Bitor America Corporation, Boca Raton, Fla., under the Orimulsion® trademark. Without limitation, this commercial product can be prepared by initial injection of steam into the asphalt formation until the viscosity is reduced to a point permitting it to flow into a well bore. A primary aqueous emulsion is prepared which further reduces asphalt viscosity and facilitates handling and transportation. The primary emulsion is then broken with the water substantially removed, leaving an asphalt material with less than 2% water.

Alternatively, the asphalt in the formation can be dissolved or suspended in a light hydrocarbon solvent, such as for example, kerosene, and the kerosene-containing bitumen removed to the surface where separation of the bitumen and kerosene can be effected.

Fresh water is then introduced or reintroduced and the asphalt is emulsified with a surfactant under strictly controlled protocols. For example, for a shear rate of 20 $s^{-1}$, a viscosity of about 450 mPa is achieved by handling the Orimulsion® fuel at 30° C. This and comparable production methods and techniques provide an aqueous emulsion with no more than 2% of the droplets having a diameter higher than 80 micrometers. The Orimulsion® material is further characterized by density (~1,010 Kg/m³ at 15° C.), flash point (~130° C./266° F.), and concentrations of vanadium (~300 ppm), nickel (~73 ppm), magnesium (~350 ppm), carbon (~60.0 weight percent), hydrogen (~7.5 weight percent), sulfur (~2.7 weight percent), nitrogen (~0.50 weight percent) and oxygen (~0.20 weight percent).

It will be understood by those skilled in the art that the compositions and/or methods of the present invention are not necessarily restricted by incorporation of an oxidation product of any one aqueous emulsion of the type profiled above. Whereas a commercially-available Orinoco asphalt material might be described as a 30% aqueous emulsion prepared with a nonionic surfactant, the compositions of the present invention can suitably comprise, consist of or consist essentially of the oxidation product of such material and/or oxidation products of other comparable Orinoco-type asphalts. Each such oxidation product is compositionally distinguishable, characteristically contrasted and can be practiced in conjunction with the present invention separate and apart from another. Accordingly, it should be understood that the inventive compositions, illustratively disclosed herein, can be prepared and/or practiced in the absence of any one oxidation product and/or species which may or may not be specifically disclosed, referenced or inferred herein, the absence of which may or may not be specifically disclosed, referenced or inferred herein.

It will also be understood that when materials are added to the naturally occurring asphalt from the Orinoco Belt, either in the form of an aqueous emulsion or otherwise, some of such added materials can have a significant impact on the concentration of the oxidation product of the asphalt in the final material recovered from the oxidation process. Thus, for example when a magnesium salt is a incorporated as part of the aqueous emulsion, the final material recovered from the oxidation typically will have a concentration of magnesium compounds comprising about half of the total final material recovered from the oxidation.

We have found that other materials can also be included in the composition of our invention without deleteriously affecting the desirable fire retarding properties otherwise obtained. Specifically we have found that certain materials can actually have a beneficial affect upon the overall properties of the composition. Illustrative of such a material is a mixture of the halides, hydroxides, carbonates and sulfates of Group IA and IIA metals. Mixtures such as these can be conveniently obtained from the waste solids produced in the aqueous scrubbing of flue gasses. We generally can employ these mixtures in concentrations almost equal to the amount of oxidation product employed. Preferably, we can utilize these mixtures in proportion to the oxidation products in the range of about 20 parts by weight mixture to 80 parts by weight oxidation product (20/80) to about 60/40. We have found that a 30/70 blend is quite satisfactory. Typical analysis of a material of this type is set forth below.

| | |
|---|---|
| $MgSO_4 \cdot 1H_2O$ | 50–60% by wt. |
| $CaSO_4 \cdot 2H_2O$ | 10–15% by wt. |
| NaCl | 10–11% by wt. |
| KCl | 3–5% by wt. |
| $Na_2SO_4$ | 3–5% by wt. |

While other components, preparations, mixtures or formulations involving a naturally occurring Orinoco-type asphalt can be used herewith, a useful source of oxidation product is available under the PCS trademark, available from Pure Air, a division of Air Products and Chemicals, Inc. of Allentown, Pa. As described compositional profile of an oxidation product will reflect any process, operation and/or additive auxiliary to the naturally occurring Orinoco Belt asphalt and/or combustion process. However, any such oxidation product—while compositionally distinguishable, characteristically contrasted, and separately practiced—will reflect either the absolute or relative vanadium and nickel concentrations characteristic of a naturally occurring asphalt from the Orinoco Belt of Venezuela.

In various embodiments, the bituminous compositions of the present invention and/or bitumen component thereof can also contain at least about 1.0 percent and up to about 40 percent by weight of a polymeric material, of the type but not limited to an elastomer, a plastomer or a combination of one or more elastomers and plastomers. As with the oxidation product discussed above, the useful polymer concentration range is a factor of the enhancement of various desired performance properties in conjunction with considerations such as cost-effectiveness. In a general sense, elastomers can be defined as those polymeric materials extendable under low stress without rupture and exhibiting resilient properties upon stress removal. Likewise, in a general sense, plastomers can be defined as polymeric materials of the type which, under stress conditions, rupture when deformed.

In preferred embodiments, a polymer component of the present invention can be a styrene-butadiene-styrene co-polymer, styrene-butadiene co-polymer, styrene-butadiene-rubber co-polymer, ethylene-vinylacetate co-polymer, isotactic and/or atactic polypropylene, polyethylene, or a combination thereof. Other suitable polymeric systems include, without limitation, styrene-ethylene-butylene-styrene, atactic polyolefins, polyvinylchloride, various polyvinylchloride blends such as ethylene interpolymers, as well as various chloroprene, acrylate, and nitrile rubber systems.

The percentages of each monomer, block or otherwise, can vary from system to system, depending upon commercial availability, desired properties, and end use or application. By way of example and without limitation, a styrene-butadiene-styrene co-polymer can contain from about 20 to about 40 weight percent styrene, preferably from about 25 to about 30 weight percent; while an ethylene-vinylacetate system can contain form about 20 to about 50 weight percent vinylacetate, preferably from about 30 to about 40 weight percent. Other physical properties, such as molecular weight and structure/morphology can be chosen, in accordance with this invention, to meet the performance properties or requirements of a particular bituminous composition.

While there are currently no ASTM standard specifications for polymer-modified asphaltic compositions, various properties are recognized as indicative of performance, including those properties assessed in the examples which follow herein. The protocols for most evaluations can be found in or derived from the ASTM D 5147 test method standard, which is incorporated herein by reference in its entirety. However, standard specifications have been developed for various coal tar and coal tar pitch compositions, such as those used for pavement coatings and overlays, and are found in or derived from the ASTM D 4866 standard performance specification, and elsewhere in the Annual Book of ASTM Standards, incorporated in pertinent part herein.

Various embodiments of the bituminous compositions described herein can also include a filler material in an amount of at least about 1 percent by weight and up to about 80 percent by weight. Fillers can be used as bulking agents, in concentrations as needed, to thicken and/or stabilize bituminous compositions after application, as well as to impart various texture properties-especially so in the roofing context. As distinguished from the aggregate materials, discussed below, filler materials are typically size-graded below 40–60 mesh and can be composed partially or in their entirety of the various silicates, the halides, hydroxides, carbonates and sulfates of Group IIA metals, as well as the halides, hydroxides, carbonates and sulfates of Group IA metals. In particular, without limitation, useful filler materials can include sand, mica, ground slate, diatomaceous earth, and ground limestone, or their compositional components. Bituminous compositions incorporating such a filler material can also include an elastomer, plastomer or combination thereof, in concentrations and in the manner as described above.

As discussed above, the present invention also includes bituminous compositions wherein an included polymer component can be a combination of a plastomer and an elastomer. A preferred combination is one in which the elastomer component is present in the range from about 0.1 to about 3 percent by weight and the plastomer is present in the range from about 1 to about 10 percent by weight percent both of the bitumen base material. Other concentrations of elastomer and/or plastomer can be used, again depending upon the end use or application envisioned. However, generally and without limitation, the ratio of elastomer/plastomer concentration useful for most applications—and especially so in the binder context—is one derived from the relative weight percents described above. It should be understood that the concentration of oxidation product present in a bituminous composition, including a polymeric component, can range from about 0.1 to about 60 percent by weight, the particular concentration dependent upon the performance properties desired as determined by the individual properties imparted by both the polymer and oxidation product components.

The polymer-modified and/or bitumen-modified compositions of this invention can be prepared by any one of various suitable methods known to those skilled in the art. Typically, for hot bitumen compositions, the oxidation product is combined at temperatures of from about 325° F. (160° C.) up to about 400° F. (205° C.) and preferably from about 350° F. (210° C.) up to about 375° F. (190° C.), with low shear mixing usually sufficient. Mix temperatures must be adequate to fluidize the bitumen component and ensure substantially homogeneous dispersion of, and complete reaction of and/or interaction of the oxidation product. Mix temperatures and times should be chosen to minimize thermal degradation of the system.

The bituminous composition of the type useful as roofing materials can include, in addition to the oxidation product, the various filler materials described above and/or a partially air-blown bitumen. Such blended materials can include a filler present in the range from about 1 percent to about 20 percent by weight and oxidation product present in the range from about 25 percent to about 55 percent by weight. Without limitation as to the identity of a particular filler, a preferred embodiment is one in which the oxidation product and the filler have a combined concentration from about 15 percent to about 70 percent by weight of the total composition. Various preferred embodiments, available depending upon a particular end use and/or application, include those in which (1) the oxidation product and filler have a combined concentration from about 15 percent to about 30 percent by weight of the total composition, and (2) those where the oxidation product and the filler have a combined concentration from about 50 percent to about 70 percent by weight of the total composition.

Polymeric systems can also be used to modify roofing materials. For instance, incorporation of one or more elastomers can improve rheological characteristics at high temperatures without sacrificing low temperature properties. An elastomer in the range from about 5 percent to about 15 percent by weight can be used in conjunction with about 20 percent to about 40 percent by weight of an inventive oxidation product. Likewise, a plastomer, in the range from about 5 percent to about 40 percent by weight, can be used in conjunction with about 20 percent to about 40 percent by weight of an inventive oxidation product. Such elastomeric and plastomeric bituminous compositions can be used in conjunction with coatings and other roofing products and can be applied/installed using techniques completely analogous to those for conventional polymer/modified materials. For example, a bitumen material modified with the present oxidation product and atactic polypropylene can be torch-applied over a base sheet. Alternatively and for purposes of example only, a bitumen modified with the present oxidation product and a styrene-butadiene-styrene block co-polymer can be hot-mopped over a suitable base sheet. Likewise, without limiting the present invention, a self-adhering styrene-butadiene-styrene modified membrane prepared with the inventive oxidation product can be applied over a base sheet for a suitable water proofing layer. Without exception, the polymer- and/or bitumen-modified compositions of this invention can be utilized in any manner useful with conventional modified materials, allowing for changes in physical properties and/or characteristics induced by incorporation of the oxidation product of this invention.

The bituminous compositions described above can be prepared over a wide range of process conditions including, without limitation, temperature, mix time, component concentration, and order and/or rate of component incorporation. The choice and/or combination of process conditions can, to a large extent, determine the physical and/or performance properties of the resulting bituminous composition and, ultimately, the most beneficial use or application. Well-known blending or mixing procedures can be employed for preparation of various roofing. As will be understood by those of skill in the art, equipment such as binder reaction chambers, attrition mills, injection systems, high-shear blending process units, and the like can be used. However achieved, thorough and complete incorporation of all ingredients/components as preferred to achieve homogeneity and to maximize the modification/enhancement of the desired the performance properties.

Generally, the compositions of this invention can be prepared by admixing the oxidation product with a bituminous base material at a temperature in the range from about 40° F. (4° C.) to about 850° F. (450° C.). Where a process is conducted beyond ambient temperatures, the bitumen is preferably heated to about 200° F. (90° C.) to about 850° F. (450° C.) and maintained at such a temperature through sufficient mixing of the oxidation product and any other component with the bitumen. It will be understood by those of skill in the art made aware of this invention that a useful process temperature is a factor of the particular process pressure employed, limited only by the available technology, and one which will not unduly impede incorporation of the oxidation product.

In accordance with this invention, the oxidation product can be incorporated into a bitumen at the various temperatures over which an asphalt or coal tar-based material might be refined, distilled, or otherwise manufactured. For example, about 0.2–60 weight percent oxidation product can be incorporated into a bitumen base material at a temperature in the range of from about 300° F. (140° C.) up to about 500° F. (260° C.). The resulting compositions will tend to exhibit improved hardness and viscosity over the bitumen base material and can be used effectively in the roofing context.

Where the bituminous compositions include a polymeric component, the process temperature should be less than about 450° F. (230° C.). Admixture with a bituminous base material at higher temperatures can have a deleterious effect on the polymer component. Depending upon the chemical and/or physical characteristics of a particular polymer, higher temperatures may effect thermal degradation, cross-linking, or other various structural changes which can negate the benefits otherwise available through polymer incorporation. Notwithstanding the process temperature referenced above, certain polymeric components can be used beneficially depending upon their thermal stability. Where a polymer-modified composition is desired, a preferred methodology is to admix, sequentially, asphalt, polymer, oxidation product, and filler material—at concentrations described more fully above.

Preferably, at the process and/or mix temperature chosen, the bituminous base material has sufficient fluid characteristics to permit facile and homogeneous incorporation of an oxidation product and whatever additional fillers, polymeric components and other modifiers desired. At temperatures approaching the upper end of the aforementioned range, the bituminous base material is invariably fluid. However, fluid characteristics can also be imparted to the base material by either mixing it with a suitable solvent to form a "cutback solution" or forming an emulsion with water.

The bituminous compositions prepared in this manner are designed to be employed without an external source of heat over a wide range of weather and application conditions, while still meeting specific performance standards. In addition to the components described above, various other materials can be incorporated into the bitumen solution or emulsion to achieve and/or improve one or more performance characteristics: fibers (synthetic and otherwise), pigments, and various miscellaneous chemical additives, including dispersants and surfactants, among others.

To prepare a bituminous cutback material, the oxidation product of this invention can be simply blended with a base material, at ambient or raised temperatures. Using techniques well-known to those skilled in the art, about 1–40 percent by weight oxidation product can be incorporated into bitumen cutback at temperatures up to about 160° F. (70° C.). The temperature utilized will be somewhat dependent upon the particular solvent system chosen, the amount of oxidation product and the specific bitumen; however, a preferred embodiment is one in which about 1–20 percent oxidation product is incorporated into an asphaltic base material at temperatures ranging from the ambient to about 140° F. (60° C.). Depending upon incorporation of filler, aggregate and the time over which the components are mixed and/or heated, the resulting compositions can find utility in either the roofing or paving contexts. As has been discussed with other embodiments, implementation of the present invention as part of a cutback system couples an economic advantage with improved performance. A lower cost, less-suitable bitumen base material can be modified to increase hardness, viscosity, and/or temperature-stability and provide an end product less susceptible to separation from any included filler and/or fiber component. Likewise, the resulting bituminous composition is more resistant to cracking at low temperatures and flow deformation at high temperatures. Higher viscosities can also enhance uniformity during processing, shipping and storage, without adversely affecting the shear-susceptibility of the applied end product.

The cutback base materials which can be used in conjunction with the methods of the present invention can be of the medium-cure, rapid-cure, or slow-cure varieties, with the solvent selected to control the cure rate of the resulting bituminous composition. Suitable cutback solutions can be purchased pre-blended from sources well-known to those skilled in the art. Alternatively, without limitation, cutback solutions can be prepared from various petroleum asphalts, coal tars or pitches upon solution with commercially-available solvents such as but not limited to Rule and Non-Rule 66 mineral spirits, kerosene/No. 2 fuel oil, and the like, as are provided by various well-known suppliers of distillates.

Where the bitumen base material is an aqueous emulsion, such materials can be prepared from either a neat bitumen or a cutback solution thereof. The oxidation product of the present invention can be blended into the bitumen at ambient or raised temperatures prior to emulsification. Using well-known methods and techniques, about 1–40 percent by weight oxidation product can be incorporated into bitumen emulsions at temperatures up to about 200° F. (93° C.). The temperature utilized will be somewhat dependent upon the particular emulsifier system chosen, the amount of oxidation product and the specific bitumen; however, the preferred embodiment is one in which about 1–20 percent oxidation product is incorporated into an asphaltic base material at temperatures ranging from the ambient to about 140° F. (60° C.). Depending upon incorporation of filler and the time over which the components are mixed and/or heated, the resulting compositions can find utility in either the roofing or paving contexts. Emulsions produced in this manner can be used to prepare a variety of bituminous compositions, with the properties and characteristics described above.

While used more typically with cutback solutions than emulsions, both base materials can incorporate one of several clay components, such as the attapulgite, bentonite, and ball varieties, with or without a surfactant, to provide various texture, strength and thixotropic properties which might otherwise be provided through the use of an asbestos material.

It should be understood that emulsions of the sort discussed herein include those where clay and bitumen provide the discontinuous phase. Inverted emulsions, with water as the discontinuous phase, are also contemplated. Likewise, as mentioned above, various cutback emulsions, prepared from an bitumen/solvent slurry emulsified in water, can also be used—with either the water or slurry components as the discontinuous phase.

As mentioned above, the bituminous compositions can be prepared by various methods and/or orders of mixing. For instance, the inventive oxidation product can be first combined with any one or combination of the filler materials or compositional components thereof, such that the combined oxidation product and filler is available for admixing with a suitable bitumen. In such embodiments, the filler material can be present in a concentration as little as about 1 percent by weight or, alternatively, at a concentration at or about 55 percent by weight. In a similar fashion, a suitable concentration of the oxidation product, alone or with a filler, can be incorporated into a fiber material for later addition to a bitumen such as but not limited to asphalt. Likewise, the oxidation product can be dry blended with an aggregate for admixture with a bitumen base material. Where a heated bitumen is required, such an embodiment might also include pre-heating the oxidation product/aggregate blend to minimize congealing bitumen on the aggregate surface.

As mentioned above, various materials have been suggested and used to impart fire retarding properties to a variety of materials. One in particular that has been suggested in the past is a material referred to as "fly ash." Reference to the literature will reveal that the material employed and defined is, in fact, the well known material obtained from the combustion of coal. Illustrative of this are authoritative documents such as ASTM C 618-93, "Standard Specification for Fly Ash and Raw or Uncalcined Natural Pozzolan for Use as a Mineral Admixture in Portland Cement Concrete", and some of the patents mentioned above (e.g., U.S. Pat. Nos. 4,425,440 and 4,430,108). So as to make it abundantly clear that the oxidation products of this invention are not the fly ashes of the prior art, the following Table A shows the chemical compositions of the different materials. In connection with the oxidation products of this invention ("Oxid. Prod." in the following table), samples were analyzed for chemical composition. Elemental metals were determined by flame absorption spectroscopy, compared to standard solutions, after dissolution of the sample in hydrochloric acid. Total sulfur content (as sulfate) was determined by a gravimetric method as more fully described in ASTM standard procedure C.° 114, after digestion of the sample in hydrogen peroxide and 1:4 (v/v) nitric acid/hydrochloric acid. The insoluble residue of the particular sample analyzed was not identified.

Reference is made to the following tables to illustrate the distinction of the oxidation product of this invention from the material commonly termed "fly ash" as described and defined in U.S. patents and ASTM C618 standard specification.

TABLE B

| Component | Fly Ash Min | Fly Ash Max | Oxidation Product Min | Oxidation Product Max |
|---|---|---|---|---|
| $SiO_2$ | 35 | 50 | — | — |
| $Fe_2O_3$ | 4 | 8 | | |
| $Al_2O_3$ | 7 | 14 | | |
| CaO | 25 | 40 | | |
| $SO_3$ | | 10 | | |
| MgO | | 6 | 16 | 24 |
| $MgSO_4$ | | | 42 | 70 |
| $Mg_2S_2O_7$ | | | 5 | 15 |
| $VO\ SO_4 + V_2O_5$ | | | 10 | 20 |
| $NiSO_4$ | | | 1 | 4 |

All values are per cents by weight.

Again, it can be seen that the composition of the oxidation product of this invention is totally different from the com-

TABLE A

| Components, (wt %) | Coal Fly Ash 4,425,440 | Coal Fly Ash 4,430,108 | ASTM C618-93 C | ASTM C618-93 F | ASTM C618-93 N | Orinoco Oxid. Prod. | Orimulsion Oxid. Prod. |
|---|---|---|---|---|---|---|---|
| Minimum $SiO_2$, $Al_2O_3$ & $Fe_2O_3$ | | | 50.0 | 70.0 | 70.0 | | |
| $SiO_2$ | 47.1 | 50–60 | | | | 0.4 | 0.2 |
| $Al_2O_3^1$ | 22.2 | 15–25 | | | | 0.2 | 0.08 |
| $Fe_2O_3^1$ | 8.7 | yes | | | | 0.7 | 0.33 |
| $CaO^1$ | 3.4 | yes | | | | 3 | 1.4 |
| $MgO^1$ | 3.0 | | | | | | 21.4 |
| $MgSO_4$ | | | | | | | 55 |
| $Mg_2S_2O_7$ | | | | | | | 10 |
| $MgCO_3 + MgO$ | | | | | | | 8 |
| $Na_2O^1$ | 1.0 | | | | | 5 | 2.2 |
| $K_2O^1$ | 3.9 | yes | | | | 0.1 | 0.06 |
| $TiO_2$ | 0.7 | | | | | 0.2 | 0.1 |
| $SO_3^1$ | 0.4 | | 5.0, max | 5.0, max | 4.0, max | | 48.3 |
| $P_2O_5^1$ | 0.4 | | | | | | |
| $V_2O_5^1$ | | | | | | 30 | 13.8 |
| $NiO^1$ | | | | | | 5 | 2.0 |

[1]Metal reported as oxides.

From Table A, above, it can readily be seen that the oxidation product of this invention is clearly dissimilar from the materials traditionally termed "fly ash." Thus, it will be noted that the dominant ingredients in fly ash are silicon, aluminum and iron, reported as their oxides ($SiO_2$, $Al_2O_3$ and $Fe_2O_3$), while the dominant metals in the oxidation product of this invention are magnesium, vanadium and nickel, with iron being a minor component and silicon and aluminum being substantially absent. A further comparison of the typical maximum and minimum values for Class C and Class F fly ash versus the typical maximum and minimum values for the oxidation products of this invention obtained from an aqueous emulsion of naturally occurring asphalt from the Orinoco Belt of Venezuela to which magnesium was added are shown in Table B, below.

ponents normally present in fly ash. Accordingly, it will be understood that the oxidation product of the present invention is not the same as the traditional "fly ash", is chemically distinct therefrom and would not be expected to behave in the same manner as "fly ash."

EXAMPLES

In order to illustrate our invention in greater detail, reference is made to the following examples. While the oxidation product of the following examples was derived from the combustion/oxidation of an aqueous emulsion of an Orinoco asphalt, the oxidation product/component of this invention can include, as more fully described above, various other constituents/residues manifesting one or more processes and/or additives auxiliary to the combustion/oxidation process-constituents/residues that would be reflected by their analytical profiles.

Example 1

In the following examples several batches of asphaltic roofing compositions were prepared by blending different quantities of the product of oxidation of Orimulsion fuel, per se, (referred to in these examples as "OP") as well as OP combined with mixtures of halides, hydroxides, sulfates and carbonates of Group IA and IIA metals, of the type described above. The particular concentrations and proportions of components in the various batches are set forth in the tables below.

These batches were utilized to make specimens of roofing coating composition. These roofing coating compositions are asphalt coatings analogous to those used in the manufacture of prepared asphalt roofing products, including modified bitumen membranes, built-up roofing roll products and shingles. Individual specimens, measuring about 4 inches wide by about 14 inches long and about ⅛ inch thick were coated onto organic saturated felt. The specimens were then subject to modified Spread-of-Flame tests as described in Standard for Tests for Fire Resistance of Roof Covering Materials, UL 790, incorporated herein in its entirety by reference. One group of specimens were positioned at a slope of a 5 inch rise over a 12 inch length (5/12), while another group of specimens were positioned as a slope of a 2 inch rise over a 12 inch length (2/12).

A propane flame with a 3 inch fan tip was disposed such that the fan tip was positioned three inches up from the lower edge of the coated organic saturated felt (COSF) and centered transversely on the COSF, with the tip ⅛ above the specimen. The flame was turned full on, ignited and maintained impinging on the specimen for 10 minutes. A laminar air flow of 11–12 mph was maintained across the specimens for the tests duration. At the end of each test, the flame was turned off and the specimen examined and ranked as follows:

| | |
|---|---|
| 1–2 | 60% + unburned |
| | No lateral or vertical flow |
| 3–4 | 50% unburned |
| | No lateral flow, vertical flow 0–2" |
| 4–5 | 50% unburned |
| | No lateral flow, vertical flow 2–4" |
| 5–6 | 40% unburned |
| | No lateral flow, vertical flow >6" |
| 7–8 | 30% unburned |
| | Minor lateral flow or vertical flow >8" |
| 9–10 | ≦20% unburned - high lateral or vertical flow or total combustion |

The results of testing the specimens utilizing several concentrations of additives at a slope of 5/12 are set forth in the following table.

TABLE 1

| Asphalt | wt % | | | | | | |
|---|---|---|---|---|---|---|---|
| Coating @ 225° F., S.P. | 40 | — | | | | | |
| Air-Blown @ 138° F., S.P. | — | 40 | 40 | 40 | 40 | 40 | 40 |
| Additive | | | | | | | |
| Limestone | 60 | 30 | 20 | 40 | 30 | 20 | 40 |
| OP | — | 30 | 40 | 20 | 21 | 28 | 14 |
| IA & IIA metal salts | — | — | — | — | 9 | 12 | 6 |
| Spread of Flame Rating | 9/9[a] | 5/7/5[b] | 3/4/3[b] | 5/5/5[b] | 4 | 5 | 5 |

[a]Duplicate Specimens
[b]Triplicate Specimens

From the above data it can be seen that the specimens containing 60% limestone, a typical residential shingle coating composition, had a Spread of Flame rating of 9, representative of only 20% of the specimens remained unburned and with high flow of melted asphalt off the specimens. Replacing a modest amount of the limestone with the OP of this invention (20/40) provided Spread of Flame ratings of 5, i.e. as much as 40% unburned specimen with flow off the specimens reduced to 4 inches. When the proportion of limestone replaced by OP of this invention was increased to 40/20, the Spread of flame rating for the specimens was further reduced to about 3–4. This is representative of a material with 50% unburned specimen and flow off the specimen of about 0–2 inches.

Example 2

In this Example a series of samples were prepared using a typical modified bitumen mix of 84% by weight asphalt flux and 16% by weight of styrene-butadiene-styrene (SBS) polymer. Each of the samples was mixed with a variety of materials, including limestone (a conventional filler), the oxidation product of this invention, the salts of IA and IIA metals described above, and various blends of these materials, including a 67 percent by weight oxidation product, 28 percent by weight salts of IA and IIA metals, and 5 percent by weight ammonium sulfate. The particular proportions are set forth in Table 2, below. Each of these samples was tested similar to the manner described in Example 1 to obtain a UL 790 Spread of Flame rating.

TABLE 2

| Formula | Amounts | | | | |
|---|---|---|---|---|---|
| Asphalt + SBS | 75 | 75 | 75 | 75 | 75 |
| Limestone | 25 | | | | |
| IA & IIA salts | | 25 | | | |
| OP (oxid prod) | | | 25 | | |
| OP/salts/AmS | | | | 25 | |
| 70 OP/30 salts | | | | | 25 |
| UL 790 Rating | 10 | 2 | 7 | 3 | 3 |

All amounts are weight per cent.

In the above tests, the control sample with conventional filler completely consumed itself in 5 minutes of a test which is supposed to run for 10 minutes. From the data in the above table it can be seen that the oxidation product of this invention enhanced the fire retardancy of the basic bitumen mix and permitted the sample to survive the full 10 minutes of the test. It will also be noted that when a 70% OP and 30% salts mixture was employed, the results were quite good.

Example 3

In this example evaluation was made of ASTM D 2824 Aluminum—Pigmented Roof Coatings. Three sample compositions were prepared—a control with no additives, control with the oxidation product of this invention (OP) and control with a 70/30 by weight mixture of OP and salts of IA and IIA metals. Samples of these material were than subjected to Direct Flame testing in accordance with ASTM D 2939, incorporated herein by reference. This test proceeds for eight minutes with observations recorded at 30, 60, 120, 240 and 480 seconds. The results are shown in Table 3, below.

TABLE 3

| | Direct Flame Exposure Time, seconds | | | | |
|---|---|---|---|---|---|
| Observation | 30 | 60 | 120 | 240 | 480 |
| w/ OP | | | | | |
| Sustained Fire | y | y | n | n | n |
| Char Formation | y | y | y | y | y |
| Blistering | n | n | y | y | y |
| Separation/Flaking | n | n | y | y | y |

TABLE 3-continued

| | Direct Flame Exposure Time, seconds | | | | |
|---|---|---|---|---|---|
| Observation | 30 | 60 | 120 | 240 | 480 |
| w/ OP/salts (70/30) | | | | | |
| Sustained Fire | y | n | n | n | n |
| Char Formation | y | y | y | y | y |
| Blistering | n | n | n | n | n |
| Separation/Flaking | n | n | y | y | y |
| Control | | | | | |
| Sustained Fire | n | y | y | y | y |
| Char Formation | n | n | n | n | n |
| Blistering | n | y | y | y | y |
| Separation/Flaking | n | y | y | y | y | y = yes
n = no

In the above described tests, extended Sustained Fire is undesirable as is Blistering and Flaking. On the other hand, Char Formation is desirable.

From the data in Table 3 it can be seen that the control formulation continued to burn throughout the entire 480 seconds of the test and did not char. The control also liberated heavy smoke throughout. As distinguished from this, the samples containing OP and OP/salts quickly achieved sustained fire and formed an intumescent char. By 120 seconds, these samples were no longer burning indicating that combustible materials had been consumed and a char was left. It can also be seen that blending the OP with the salts did not detract from the fire retardancy imparted by the OP, but appears to enhance further the fire retarding properties of the base material.

Example 4

In this example several test samples were prepared using the same base polyurethane foam material prepared from the following components:

| | parts by weight |
|---|---|
| I. A-Component | |
| Mondur MR isocyanate | 206.2 |
| II. B-Component | 343.0 |
| Voranol 370 polyol | 130.0 |
| Stepanol 2352 polyol | 130.0 |
| DC 193 surfactant | 5.0 |
| HCFC-14b blowing agent | 78.0 |
| III. C-Component | 3.0 |
| Polycat 8 catalyst | 2.4 |
| T-9 catalyst | 0.6 |

A control sample with no additive was prepared as well as a control with Antiblaze 80 (AB 80), a known chlorinated phosphate ester fire retardant commercially available from Albright Wilson America Corp., and several samples with varying concentrations of the oxidation product of this invention (OP), including a sample in which the additive was a mixture of 70 percent by weight of the additive and 30 percent by weight of the salts of Group IA and IIA metals, as described above and as is obtainable from the "blow down" solids from an aqueous scrubbing operation. The samples prepared with the materials of this invention produced satisfactory foams, while the sample utilizing AB 80 collaspsed during preparation and did not form a satisfactory foam.

The foam samples were subjected to a 24 hour ambient cure and then subjected to testing, including Oxygen Index (ASTM D 2863), Closed Cell Content (ASTM D 2856) and apparent density. Some samples were subjected to testing for tumbling friability (ASTM C 421). No testing was conducted on the sample prepared with Antiblaze 80 due to its failure to form an acceptable foam. The other samples were also subjected to the Mobil 45° Angle Flammability Test, which correlates with ASTM E 84.

The Mobil 45° Angle Flammability Test is a small scale laboratory test developed by Mobil Chemical Company for assessing the flame properties of low density, rigid polyurethane foams. Results of this test correlate with ASTM E-84. This test is a convenient tool for determining the most effective flame retardants, polyols, isocyanate and other composition factors in designing formulations for low flame spread ratings by E-84.

The apparatus includes a test chamber as described in ASTM D-62-59T or a suitable draft-free hood, a burner such as an Anderson-Forrester micro burner for natural gas or equivalent (cf Phipps and Bird, Cat. No. 8-860), a specimen support, and a suitable apparatus for holding the foam sample with the long axis 45° to the horizontal. The foam sample is supported by seven stiff steel pins 3" long, $\frac{1}{16}$" diameter which in turn are welded to $\frac{1}{2}$" steel rod. The steel rod is mounted on two ring clamps.

At least 3 test specimens (2"×8.5"×½" with the foam rise parallel to the ½" dimension) are needed initially for routine evaluation. Each dimension should not deviate more than $\frac{1}{32}$" from that specified above with the ½" dimension being the most critical. Care should be taken to remove all dust from the sample surface by vacuuming or with an air hose. Foam samples are cut after the foam has cured at least 24 hours at room temperature. The samples should be conditioned according to Procedure A, ASTM D-618.

Each sample is weighed to the nearest 0.01 gm and placed on the support by pushing all seven pins through the foam, making sure the points are even with the surface. The long axis of the sample is maintained at an angle of 45° with the horizontal. The lowest point of the foam sample is maintained ½" above the burner top when the flame is applied. The plane through the 2" dimension is parallel with the flame. The burner is adjusted to provide a blue flame whose visible portion is 1.5" high so that the flame spreads evenly along the two surfaces parallel to the flame and the two surfaces forming 45° angles. The burner is left under the sample until all visible flaming ceases. Samples are weighed to the nearest 0.01 gm and the % weight loss is calculated.

The compositions of the various samples and the data recorded are set forth in Table 4, below.

TABLE 4

| Sample | Additive, % by wt. | $O_2$ Index | Mobil 45° (% loss) |
|---|---|---|---|
| Control | 0 | 19.3 | 70.2 |
| Ctrl + AB80 | 4.7 | — | — |
| OP | 2.6 | 19.8 | 74.9 |
| OP | 4.7 | 20.3 | 73.1 |
| OP | 10.5 | 20.8 | 73.6 |
| 70OP/30salts | 13.0 | 20.8 | 68.7 |
| OP | 15.3 | 20.8 | 67.3 |

From the results of this Example and the data shown in Table 4, it is evident that the oxidation product of this invention is compatible with polyurethane foam, while other well known fire retardants, such as, Antiblaze 80 apparently are not. It is not uncommon that many well known fire retardant additives are not satisfactory for use in polyurethane foams due to the fact that they severly inhibit or prevent satisfactory foam formation. Additionally, it will be seen that the oxygen index continuously improved as the loading level increased. It will also be noted that, in the Mobil 45°, a reduction in mass loss is achieved at a 10% loading indicating an improvement in fire retardancy. At a 10 percent loading, no afterglow was observed and upon removal of the flame, the foam self-extinguished.

When the oxidation product of this invention was blended with 30 percent by weight of a mixture of IA and IIA metal salts, as discribed above, fire retardancy was enhanced.

Generally, the oxidation product of this invention provides an enhancement of fire retarding properties while being compatible with polyurethane foam.

Example 5

In this example acrylic test specimens were prepared based on methylmethacrylate with an adhesive promoting monomer added and an acid catalyst. This base material was blended with 5, 10 and 20 percent by weight concentrations of a 70 percent by weight oxidation product of this invention (OP) and 30 percent by weight mixture of the above described salts of IA and IIA metals. These materials were cast into specimens of about ¼ inch thick and 3 inches in diameter. Each of the specimens was subjected to the FAA 12-Second Vertical Burn test using a 1700° F. flame. Each of the 10 and 20 percent loaded specimens self extinguished. This is a clear indication of the flame retarding properties of the materials of this invention at loadings in acrylics greater than about 10 percent by weight.

Example 6

In this Example, Shell 828 epoxy resin with cure agent TETA was employed as the base material. This base material was blended with 10 and 20 percent by weight concentrations of a 70 percent by weight oxidation product of this invention (OP) and 30 percent by weight mixture of the above described salts of IA and IIA metals. These materials were cast into specimens of about ¼ inch thick and 3 inches in diameter. Each of the specimens was subjected to the FAA 12-Second Vertical Burn test using a 1700° F. flame. The 10 percent loading specimen showed flame resistance, but did not self extinguish. The specimen with 20 percent loading, almost but not quite, self extinguished. This is an indication of the fire retarding properties of the materials of this invention, particularly at loadings of 20 percent or greater.

Example 7

In this Example, a phenolic foam was prepared from two commercial phenolic resins using cyclopentane as the blowing agent and an acid curing agent. This base material was blended with 10 and 20 percent by weight concentrations of a 70 percent by weight oxidation product of this invention (OP) and 30 percent by weight mixture of the above described salts of IA and IIA metals. These materials were poured to yield about 4 cubic inch specimens. When subjected to the flame test described above, no smoke or flame was observed, thus indicating the fire retarding properties of the materials of this invention when employed with phenolic foams.

In the following examples, specimens of representative types of polymeric plastic materials were prepared in accordance with the procedures set forth in Standard UL 94 (Underwriters Laboratories Inc.), which is incorporated herein in its entirety by reference. Thus, compositions were prepared employing the particular polymeric plastic material indicated in each of the tables below and included specimen sets with the neat plastic as well as specimen sets with several different concentrations of additives in accordance with this invention and a known fire retardant. Generally, five specimens (measuring 5×½2 mm) of each recipe were prepared and conditioned at 23° C. and at 50% Relative Humidity for 24 hours.

For each of the various polymeric plastic materials, specimen sets were prepared utilizing various concentrations of the oxidation product of this invention alone (designated OP) and using an additive composition comprising about 70 percent by weight of the oxidation product of this invention together with about 30 percent by weight of a mixture of Group IA and IIA metal oxides, halides, hydroxides, sulfates and carbonates. An additive composition of this type is commercially available from Pure Air of Allentown, Pa., under the trademark PCS. These latter specimen sets are designated PCS. Finally, specimen sets were prepared for each of the polymeric plastic materials utilizing alumina trihydrate, a known fire retardant, in various concentrations. These specimens are designated as ATH. The specific concentrations in the various specimens are shown in the particular tables below.

Each of the specimens was then tested in accordance with the procedures of UL 94. Accordingly, each specimen was held in a vertical position (with its longest dimension in the vertical direction) and suspended from a spring clamp which grasped no more the ¼ inch of the specimen along its narrow dimension. The flame of a UL 94 specified Bunsen burner, adjusted so as to extend ¾ inch from the top of the burner to the tip of the flame, was applied to each of the specimens so that there was a ⅜ inch space between the top of the burner to the bottom of the specimen. The flame was thus applied to each specimen for a period of 3 seconds and then removed. The time that each specimen remained burning was recorded. If burning of the individual specimen stopped within 30 seconds after removal of the burner flame, the flame (in the manner described above) was reapplied to the specimen for an additional 3 seconds. Again, the time each specimen remains burning was recorded.

A layer of dry, untreated cotton was placed 12 inches below the bottom of each specimen and it was noted whether a particular specimen dripped particles onto the cotton and, if so, whether the dripping particles ignited the cotton.

Each of the specimens tested was ranked in accordance with the following system.

| Ranking | Observation |
| --- | --- |
| 1 | UL - 94V-0 Rating |
| 2 | UL - 94V-1 Rating |
| 3 | UL - 94V-2 Rating |
| 4 | 2nd after flame > 101 sec |
|   | Ignite Cotton Indicator |
| 5 | 2nd after flame < 100 sec |
|   | Ignite Cotton Indicator |
| 6 | Continued burn after 2nd flame |
|   | Ignite Cotton Indicator 101–200 ec |
| 7 | Continued burn after 2nd flame |
|   | Ignite Cotton Indicator ≦ 100 sec |
| 8 | Continued burn after first flame |
|   | Ignite Cotton Indicator 101–200 sec |
| 9 | Continued burn after first flame |
|   | Ignite Cotton Indicator 21–100 sec |
| 10 | Continued burn after first flame |
|   | Ignite Cotton Indicator ≦ 20 sec |

The results of testing the specimens utilizing the various polymeric plastic materials are set forth in the following examples.

Example 8

In this Example specimens were prepared using polystyrene as the base material with OP being added at 2, 5, 10 and 15 percent by weight, PCS additive also being added at 2, 5, 10 and 15 percent by weight, and alumina trihydrate (ATH) being added at 10 percent by weight. The results of the testing are shown in Table 8, below.

seconds. Higher concentrations of the PCS mixture were also effective to increase the cotton ignition time over that of the base material.

Example 9

In this Example the base material employed is acrylonitrile-butadiene-styrene (ABS) with OP and PCS additive, as described previously, being added at 15 percent

TABLE 8

| | Trial #, wt % | | | | | |
|---|---|---|---|---|---|---|
| Polymer: Polystyrene | 100.0 | 98.0 | 95.0 | 90.0 | 98.0 | 95.0 |
| Retardant: | | | | | | |
| OP | | 2.0 | 5.0 | 10.0 | | |
| PCS | | | | | 2.0 | 5.0 |
| ATH | | | | | | |
| Fire Retardant Properties (average of 5 specimens) | | | | | | |
| Total after flame time, $t_2$, sec | Cont'd Burn | Cont'd Burn | Cont'd Burn | Cont'd Burn | Cont'd Burn | Cont'd Burn |
| After flame spread to holding clamp | Yes | Yes | Yes | Yes | Yes | Yes |
| Cotton indicator ignited @ - sec | Yes @ 18.8 sec | Yes @ 20.6 sec | Yes @ 98 sec | Yes @ 158 sec | Yes @ 14.2 sec | Yes @ 129.5 sec |
| Overall rating by UL | None | None | None | None | None | None |
| Overall relative ranking | 10 | 9 | 9 | 8 | 10 | 8 |

| | | Trial #, wt % | | | |
|---|---|---|---|---|---|
| | Polymer: Polystyrene | 90.0 | 90.0 | 85.0 | 85.0 |
| | Retardant: | | | | |
| | OP | | | 15.0 | |
| | PCS | 10.0 | | | 15.0 |
| | ATH | | 10.0 | | |
| | Fire Retardant Properties (average of 5 specimens) | | | | |
| | Total after flame time, $t_1$, sec | Cont'd Burn | Cont'd Burn | Cont'd Burn | Cont'd Burn |
| | After flame spread to holding clamp | Yes | Yes | Yes | Yes |
| | Cotton indicator ignited @ - sec | Yes @ 76.4 sec | Yes @ 21 sec | Yes @ 85.8 sec | Yes @ 90.8 sec |
| | Overall rating by UL | None | None | None | None |
| | Overall relative ranking | 9 | 9 | 9 | 9 |

From the data shown in Table 8, it can be seen that the employment of the OP of this invention improved the fire retardancy of the base polystyrene material. Even at a level of only 5 percent by weight, the oxidation product of this invention was effective to increase the time of cotton ignition from 18.8 seconds for the base material up to 98 seconds. Higher concentrations of OP provided further enhancement. Utilizing 5 per cent by weight of the PCS mixture was effective to increase the cotton ignition time from 18.8 seconds for the base material up to 129.5 seconds. In comparison, utilizing 10 percent by weight of a known fire retardant, alumina trihydrtate, was only effective to increase the cotton ignition time from 18.8 seconds to 21 by weight. Alumina trihydrate (ATH) was added at 5 percent by weight. Specimens of ABS without any additives continued to burn after removal of the flame and had an overall relative ranking of 10. Similarly, specimens with 5 percent by weight ATH also continued to burn after removal of the flame and had an overall relative ranking of 10. Addition of 15 percent by weight of the OP and PCS additive in accordance with this invention results in a decrease in the overall relative ranking.

The results of the testing are shown in Table 9, below.

TABLE 9

| | Trial #, wt % | | | | | |
|---|---|---|---|---|---|---|
| Polymer: Polystyrene | 100.0 | 95.0 | 90.0 | 95.0 | 95.0 | 95.0 |
| Retardant: | | | | | | |
| OP | | 5.0 | 10.0 | | | |
| PCS | | | | | 5.0 | |
| ATH | | | | 5.0 | | 10.0 |
| Fire Retardant Properties (average of 5 specimens) | | | | | | |
| After flame time, $t_1$, sec | Cont'd Burn | Cont'd Burn | Cont'd Burn | Cont'd Burn | Cont'd Burn | Cont'd Burn |
| Total after flame time, $t_2$, sec | Cont'd Burn | Cont'd Burn | Cont'd Burn | Cont'd Burn | Cont'd Burn | Cont'd Burn |
| After flame spread to holding clamp | Yes | Yes | Yes | Yes | Yes | Yes |

TABLE 9-continued

| | Trial #, wt % | | | | | |
|---|---|---|---|---|---|---|
| Cotton indicator ignited @ - sec | Yes @ 19.6 sec | Yes @ 18.4 sec | Yes @ 29.8 sec | Yes @ 17.6 sec | Yes @ 109.6 sec | Yes @ 21.0 sec |
| Overall rating by UL | None | None | None | None | None | None |
| Overall relative ranking | 10 | 10 | 9 | 10 | 8 | 9 |

The data shown in Table 9 demonstrate that the use of the oxidation product of this invention at a concentration of 10 percent by weight was effective to increase the cotton ignition time from 19.6 seconds for the base specimen to a level of 29.8 seconds. Distinguished from this, the use of ATH at a concentration of 5 percent by weight had no significant effect.

Example 10

In this Example specimens were prepared using polypropylene as the base material with OP being added at 5 and 10 percent by weight, PCS additive also being added at 5 and 10 percent by weight, and ATH being added at 15 percent by weight. The results of the testing are shown in Table 10, below.

TABLE 10

| | Weight % | | | | | |
|---|---|---|---|---|---|---|
| Polymer: Polypropylene (PP) | 100 | 95 | 90 | 95 | 90 | 85 |
| Retardant: | | | | | | |
| OP | | 5 | 10 | | | |
| PCS | | | | 5 | 10 | |
| ATH | | | | | | 15 |
| Fire Retardant Properties (average of 5 specimens) | | | | | | |
| Time to combust - to 70% of specimen length | 2.2 | 3.0 | 7.3 | 4.4 | 8.5 | 7.0 |

From the data in Table 10 it can be seen that as little as 5 percent by weight of OP was sufficient to increase the time to combust 70% of the specimen, while 10 percent by weight OP was effective to increase the 70% combustion time to that achieved with 15 percent by weight of ATH, a commercially recognized fire retardant. The use of the PCS mixture showed an even greater impact on increasing the time to combust 70% of the specimen. In fact, 10 percent by weight PCS additive provided a 70% combustion time that exceeded that of the ATH.

Example 11

In this Example specimens were prepared using nylon 6 as the base material with OP, as described previously, being added at 5, 10 and 15 percent by weight, PCS additive, as described previously, also being added at 5, 10 and 15 percent by weight, and alumina trihydrate (ATH) being added at 5 percent by weight. The results of the testing are shown in Table 11 below.

TABLE 11

| | Trial #, wt % | | | | | | | |
|---|---|---|---|---|---|---|---|---|
| Polymer: Nylon 6 | 100.0 | 95 | 90 | 85 | 95 | 90 | 85 | 95 |
| Retardant: | | | | | | | | |
| OP | | 5 | 10 | 15 | | | | |
| PCS | | | | | 5 | 10 | 15 | |
| ATH | | | | | | | | 5 |
| Fire Retardant Properties (average of 5 specimens) | | | | | | | | |
| Time to combust - to 70% of speciment length | 13.8 | 40.8 | 62.2 | 60.6 | 24.0 | 48.6 | 47.2 | 26.2 |

The data in Table 11 show that even low concentrations of OP, such as 5 percent by weight, are effective to increase substantially the time to combust 70% of the specimen, with higher concentrations further increasing the 70% combustion time. The PCS additive mixtures at 5, 10 and 15 percent by weight concentrations were also effective to increase the 70% combustion times over that of the base material. It will also be noted that the addition of 5 percent by weight of either OP or PCS mixture provided a 70% combustion time substantially equal to or greater than that provided by the ATH at the same concentration.

Example 12

In this Example, specimens of styrene were prepared in accordance with the procedures set forth in UL 94, Section 7—Horizontal Burning Test; 94HB. Essentially, bar specimens about 125 mm long by about 13 mm wide by about 3 mm thick were prepared and marked at 25 mm and 100 mm from the end to be ignited. The specimens were clamped at the end remote from the 25 mm mark with their longitudinal axis horizontal and their transverse axis inclined at 45°. A burner flame was applied to the specimens at the end remote from the clamp for thirty seconds. Timing was commenced when the combustion reached the 25 mm mark and the time when combustion reached the 100 mm mark was recorded.

Specimens were prepared using 100 percent by weight styrene, 2, 5 and 10 percent by weight OP, 10 and 15 percent by weight PCS additive (both OP and PCS additive being as described previously) and 10 percent by weight ATH. These specimens were then tested in accordance with UL 94, Horizontal Burning Test and the results are summarized in Table 12, below.

TABLE 12

|  | Trial #, wt % | | | | | | |
| --- | --- | --- | --- | --- | --- | --- | --- |
| Polymer: Styrene | 100.00 | 98 | 95 | 90 | 90 | 85 | 90 |
| Fire Retardant: | | | | | | | |
| OP |  | 2 | 5 | 10 | | | |
| PCS |  |  |  |  | 10 | 15.0 | |
| ATH |  |  |  |  | | | 10 |
| Property - UL 94 Horizontal | | | | | | | |
| Elapsed Time, t, sec | 103 | 98.3 | 525.7 | 574.0 | 135.0 | 159.0 | 95.7 |
| Damaged Length, L, mm | 75 | 75 | 75 | 75 | 75 | 75 | 75 |
| Linear Burning Rate, V | 43.7 | 45.8 | 8.7 | 8.0 | 33.4 | 28.7 | 47.1 |
| (V = 60 L/t) | | | | | | | |
| Flame Front Passed | | | | | | | |
| 25 mm | Yes | Yes | Yes | Yes | Yes | Yes | Yes |
| 100 mm | Yes | Yes | Yes | Yes | Yes | Yes | Yes |

From the data shown in Table 12 it can be seen that the base styrene specimen did not meet the requirements for 94HB, having a Linear Burning Rate,V, greater than 40. Similarly, the specimen with 10 percent by weight ATH had a V value greater than 40 As distinguished from this, the specimens containing 5 and 10 percent by weight OP had elapsed burning times that increased from about 100 seconds for the base styrene specimen to about 525 and 575 seconds, respectively. Further, the Linear Burning Rate for both the 5 and 10 percent OP specimens dropped drastically from over the critical value of 40 to values of about 8 to 9. Similarly, it can be seen that the incorporation of 10 and 15 percent by weight PCS additive into the styrene was also effective to permit these specimens to meet the 94HB standard.

We claim:

1. A fire retardant composition comprising a material selected from the group consisting of normally flammable plastic and asphalt/bitumen construction material and from about 2 to about 60 percent by weight based upon the total composition of a solid combustion ash of a naturally occurring asphalt from the Orinoco Belt in Venezuela.

2. The composition of claim 1 wherein the Orinoco Belt asphalt is in the form of an aqueous emulsion.

3. The composition of claim 2 wherein the aqueous emulsion contains from about 100 to about 1500 ppm of magnesium.

4. The composition of claim 1 wherein the normally flammable material is selected from the group consisting of acrylic, bitumen/asphalt, polyester, polystyrene, polyurethane, epoxoid, nylon and polypropylene.

5. The composition of claim 1 wherein the normally flammable material is acrylic and the ash is present in the range of from about 2 to about 24 percent by weight.

6. The composition of claim 3 wherein the normally flammable material is bitumen/asphalt and the ash is present in the range of from about 5 to about 60 percent by weight of the normally flammable construction material.

7. The composition of claim 6 wherein the asphalt/bitumen is a mopping grade asphalt having physical properties meeting ASTM D 312 and suitable for use in built-up roof construction and the ash is present in the range of from about 10 to about 40 percent by weight.

8. The composition of claim 7, which also contains a polymer selected from the group consisting of elastomers, plastomers and combinations thereof present in the range of from about 1 to about 30 percent by weight based on the asphalt/bitumen base material.

9. The composition of claim 6 wherein the asphalt/bitumen is an asphalt suitable for use in dampproofing and waterproofing having physical properties meeting ASTM D 449 standard specification and the ash is present in the range of from about 5 to about 30 percent by weight.

10. The composition of claim 9 which also contains a polymer selected from the group consisting of elastomers, plastomers and combinations thereof present in the range of from about 1 to about 20 percent by weight.

11. The composition of claim 6 wherein the asphalt/bitumen is suitable for use in a prepared roofing material known as residential shingles and the ash is present in the range of from about 5 to about 60 percent by weight based on the composition.

12. The composition of claim 11 which also contains a polymer selected from the group consisting of elastomers, plastomers and combinations thereof present in the range of from about 1 to about 25 percent by weight.

13. The composition of 11, which also contains a filler in the range of from about 1 percent by weight, up to about 70 percent by weight.

14. The composition of 13, wherein the filler is at least one of a silicate, Group 1A metal halaide, hydroxide, carbonate, and sulfate, and a Group 11A metal halide, hydroxide, carbonate, and sulfate.

15. The composition of claim 6 wherein the asphalt/bitumen is suitable for use in a prepared roofing material known as rolled roofing products and the ash is present in the range of from about 5 to about 40 percent by weight based on the composition.

16. The composition of claim 15, which also contains a polymer in the amount of from about 1 to about 30 percent by weight based on the asphalt/bitumen base material, which polymer is selected from the group consisting of elastomers, plastomers or combinations thereof.

17. The composition of claim 15 which also contains a filler in the amount from about 1 to about 70 percent by weight.

18. The composition of claim 17 wherein the filler is at least one of the halides, hydroxides, carbonates and sulfates of Group IA and Group IIA metals.

19. The composition of claim 13 wherein the filler is limestone.

20. The composition of claim 17 wherein the filler is limestone.

21. The composition of claim 6 wherein the asphalt/bitumen is suitable for use in prepared roofing products know as modified bitumen membranes and which also contains an elastomer in the range of from about 2 to about 15 percent by weight based on the composition, wherein the ash is present in the range of from about 5 to about 30 percent by weight based on the composition.

22. The composition of claim 6 wherein the asphalt/bitumen is suitable for use as a polymer modified roofing membrane composition which also contains a plastomer in the range of from about 5 to about 40 percent by weight based on the composition, and wherein the ash is present in the range of from about 5 to about 40 percent by weight based on the composition.

23. The composition of claim 6 which also contains a filler in the range of from about 1 to about 30 percent by weight based on the composition.

24. The composition of claim 23 in which the filler is limestone.

25. The composition of claim 6 wherein the asphalt/bitumen is a temperature-stabilized air blown grade of roofing asphalt and the ash is present in the range of from about 5 to about 40 percent by weight.

26. The composition of claim 6 wherein the asphalt/bitumen is a liquid coating containing a material selected from the additive group of inorganic fibers, pigments and specialty additives; limestone filler; and the ash is present in the range of from about 5 to about 40 percent by weight.

27. The composition of claim 26 wherein the ash is combined with the other components at one time.

28. The composition of claim 26 wherein asphalt/bitumen, the additive group and the filler are combined with each other prior to adding the ash.

29. The composition of claim 1 wherein the flammable material is polyester and the ash is present in the range of from about 0.5 to about 20 percent by weight.

30. The composition of claim 1 wherein the flammable material is acrylonitrile-butadiene-styrene and the ash is present in the range of from about 12 to about 25 percent by weight.

31. The composition of claim 1 wherein the flammable material is polyurethane and the ash is present in the range of from about 2 to about 20 percent by weight.

32. The composition of claim 1 wherein the flammable construction material is polystyrene and the ash is present in the range of from about 2 to about 28 percent by weight.

33. The composition of claim 1 wherein the flammable material is an epoxoid and the ash is present in the range of from about 5 to about 20 percent by weight.

34. The composition of claim 1 wherein the flammable material is nylon and the ash is present in the range of from about 3 to about 20 percent by weight.

35. The composition of claim 1 wherein the flammable material is polypropylene and the ash is present in the range of from about 1 to about 33 percent by weight.

36. The composition of claim 1 which also contains from about 5 to about 35 percent by weight of the composition of the solids obtained by the evaporation of the wastewater from an aqueous flue gas scrubber, which solids comprise a mixture of the halides, hydroxides, carbonates and sulfates of Group IA and IIA metals.

37. The composition of claim 14 wherein the proportion of the solids mixture to the ash is less than about 50/50.

38. The composition of claim 14 wherein the proportion of the solids mixture to the ash is less than about 40/60.

39. In a process for producing a fire retardant composition which comprises adding a fire retardant level of a fire retardant additive to a material selected from the group consisting of normally flammable plastic and asphalt/bitumen construction material, the improvement which comprises:

utilizing as the fire retardant additive the solid combustion ash of a naturally occurring asphalt from the Orinoco Belt of Venezuela.

40. The process of claim 17 wherein the Orinoco Belt asphalt is in the form of an aqueous emulsion.

* * * * *